United States Patent
Suzuki

(10) Patent No.: US 8,587,880 B2
(45) Date of Patent: Nov. 19, 2013

(54) SMALL-SIZE WIDE ANGLE LENS AND CAMERA INCLUDING THE LENS

(75) Inventor: Takashi Suzuki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 211 days.

(21) Appl. No.: 13/232,049

(22) Filed: Sep. 14, 2011

(65) Prior Publication Data
US 2012/0069456 A1 Mar. 22, 2012

(30) Foreign Application Priority Data
Sep. 17, 2010 (JP) ................. 2010-209220

(51) Int. Cl.
*G02B 9/12* (2006.01)
*G02B 13/18* (2006.01)

(52) U.S. Cl.
USPC ............................. 359/791; 359/716; 359/784

(58) Field of Classification Search
USPC .................. 359/716, 753, 784, 791
See application file for complete search history.

(56) References Cited

U.S. PATENT DOCUMENTS 7,777,974 B2 * 8/2010 Yamamoto ..................... 359/791

FOREIGN PATENT DOCUMENTS

| JP | 08-179215 | 7/1996 |
| JP | 2008040033 | 2/2008 |
| JP | 2010113248 | 5/2010 |

* cited by examiner

Primary Examiner — William Choi
(74) Attorney, Agent, or Firm — Young & Thompson

(57) ABSTRACT

A small-size wide angle lens substantially consists of a first lens group having positive refractive power, a stop, a second lens group having positive refractive power, and a third lens group having negative refractive power, which are arranged in this order from the object side. Each of the first lens group, the second lens group and the third lens group includes a negative lens and a positive lens. Further, at least one of the second lens group and the third lens group includes an aspheric surface. Further, the small-size wide angle lens satisfies predetermined formulas.

14 Claims, 9 Drawing Sheets

FIG.3 EXAMPLE 2

EXAMPLE 3

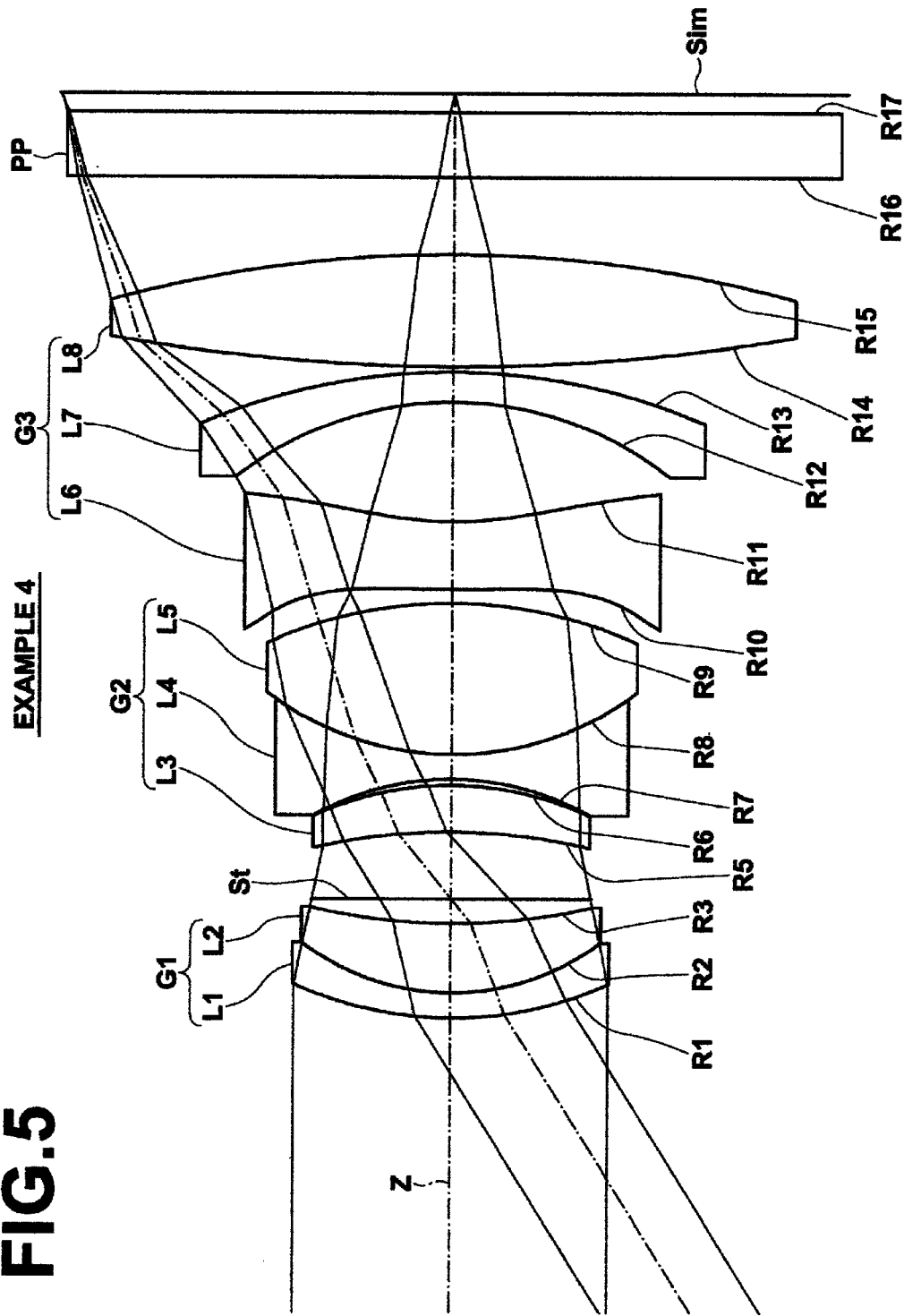

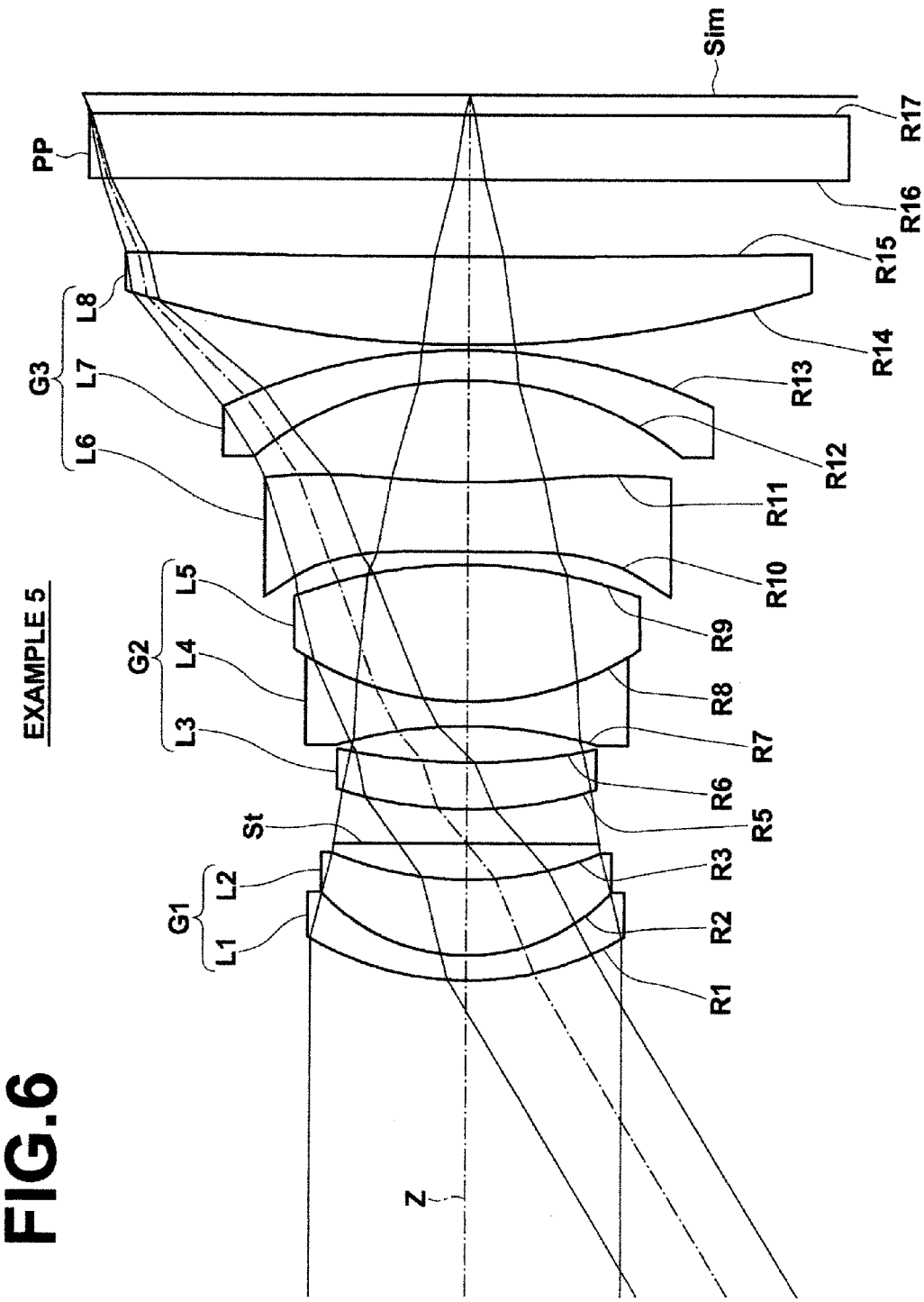
FIG.6 EXAMPLE 5

EXAMPLE 1

EXAMPLE 2

EXAMPLE 3

EXAMPLE 4

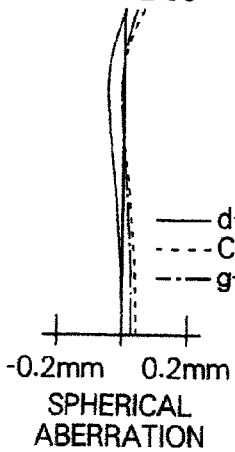

FIG. 10A
SPHERICAL ABERRATION
Fno. = 2.05
-0.2mm 0.2mm
— d-LINE
---- C-LINE
-·-· g-LINE

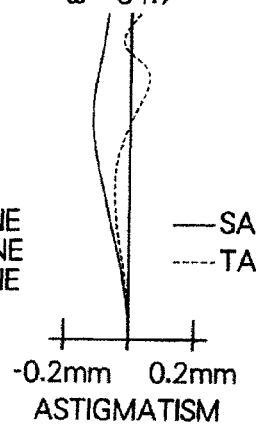

FIG. 10B
ASTIGMATISM
ω= 31.7°
-0.2mm 0.2mm
— SAGITTAL
---- TANGENTIAL

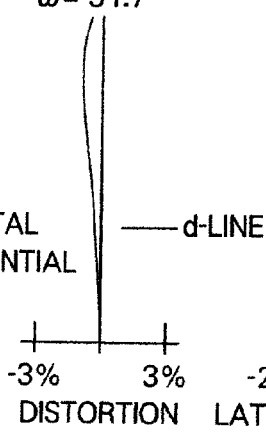

FIG. 10C
DISTORTION
ω= 31.7°
-3% 3%
— d-LINE

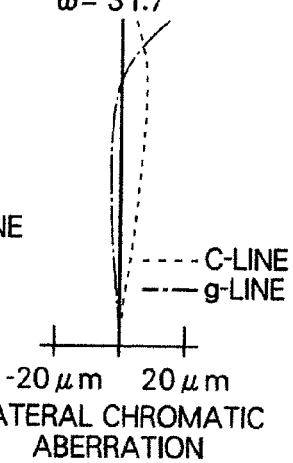

FIG. 10D
LATERAL CHROMATIC ABERRATION
ω= 31.7°
-20μm 20μm
---- C-LINE
-·-· g-LINE

EXAMPLE 5

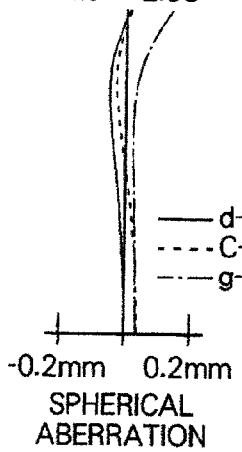

FIG. 11A
SPHERICAL ABERRATION
Fno. = 2.05
-0.2mm 0.2mm
— d-LINE
---- C-LINE
-·-· g-LINE

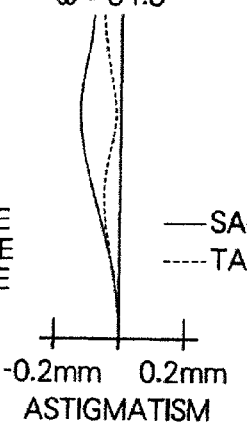

FIG. 11B
ASTIGMATISM
ω= 31.3°
-0.2mm 0.2mm
— SAGITTAL
---- TANGENTIAL

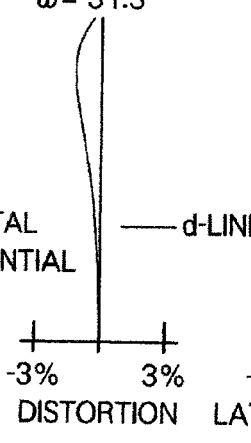

FIG. 11C
DISTORTION
ω= 31.3°
-3% 3%
— d-LINE

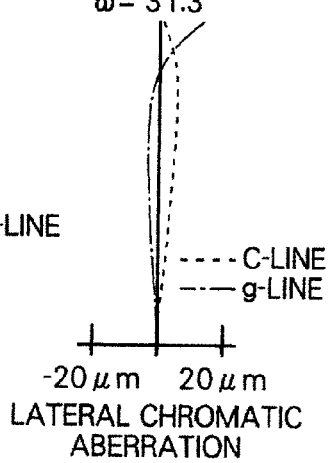

FIG. 11D
LATERAL CHROMATIC ABERRATION
ω= 31.3°
-20μm 20μm
---- C-LINE
-·-· g-LINE

SMALL-SIZE WIDE ANGLE LENS AND CAMERA INCLUDING THE LENS

BACKGROUND OF THE INVENTION

1. Field of the Invention

The present invention relates to a small-size wide angle lens and a camera including the small-size wide angle lens. In particular, the present invention relates to a small-size wide angle lens appropriate for a digital camera and a camera including the small-size wide angle lens.

2. Description of the Related Art

Generally, a lens for a compact digital camera needs to have a short back focus to reduce the size of the camera, on which the lens is mounted, when the camera is carried by a user. Further, it is important that the diameter of the lens is small. As such a lens for a digital camera, lenses disclosed for example in Japanese Unexamined Patent Publication No. 2010-113248 (Patent Document 1) and Japanese Unexamined Patent Publication No. 2008-040033 (Patent Document 2) are known. Patent Document 1 discloses a lens system consisting of a negative lens group and a positive lens group, which are arranged in this order from the object side. Further, the F-number of the lens system is 2, and the 35 mm silver halide film camera equivalent focal length of the lens system is 28 mm. Meanwhile, Patent Document 2 discloses a lens system substantially consisting of a negative lens group and a positive lens group, which are arranged in this order from the object side, and the F-number of the lens system is approximately 4.

The lens systems disclosed in Patent Documents 1 and 2 are single focal lens systems, in which focal lengths are fixed. As a zoom lens system having variable focal length, and the size of which has been tried to be reduced, a lens system is disclosed in Japanese Unexamined Patent Publication No. 8 (1996)-179215 (Patent Document 3). The lens system disclosed in Patent Document 3 consists of a positive lens group, a positive lens group and a negative lens group, which are arranged in this order from the object side. Further, each lens group includes a negative lens and a positive lens, and the F-number of the lens system at a wide angle end is 5.7.

Generally, it is desirable that rays of light enter an imaging device arranged at an image plane of a lens for a digital camera at an angle close to 90 degree to the image plane, which means that the rays of light entering the imaging device are perpendicular to the image plane. Therefore, it is desirable that a stop is located at a distant position away from the imaging device in the lens system. However, in such a lens system, a distance in the direction of an optical axis from a most-object-side surface in the lens system to the imaging device tends to become long, and that has been an obstacle for reducing the size of a camera.

Conventionally, the size of a camera when the camera is carried by a user was reduced by adopting a collapsible mount method. In the collapsible mount method, a lens is collapsed into a camera body when the camera is not used for photography, and the lens is slid out from the camera body to perform photography. However, in the collapsible mount method, time is needed to slide the lens out from a collapsed position to make the camera usable. Further, operations for sliding out or collapsing the lens consume power of a battery of the camera. Therefore, there has been a demand for a small-size lens system that can constitute a camera that is compact both in a carried state and in a photography state without using the collapsible mount method. At the same time, there has been a demand for a high performance lens system that has a sufficiently wide angle to satisfy a user's demand in recent years, and which has a small F-number.

SUMMARY OF THE INVENTION

In view of the foregoing circumstances, it is an object of the present invention to provide a small lens having excellent telecentricity, and the size of which is reduced, while maintaining a small F-number, a wide angle and high performance. Further, it is another object of the present invention to provide a camera including the lens.

A small-size wide angle lens according to a first aspect of the present invention is a small-size wide angle lens substantially consisting of:

a first lens group having positive refractive power;

a stop;

a second lens group having positive refractive power; and a third lens group having negative refractive power, which are arranged in this order from the object side of the small-size wide angle lens, wherein the first lens group includes a negative lens and a positive lens, and wherein the second lens group includes a negative lens and a positive lens, and wherein the third lens group includes a negative lens and a positive lens, and wherein at least one of the second lens group and the third lens group includes an aspheric surface, and wherein the following formulas (1) through (3) are satisfied:

$$1 < f/Y < 2 \tag{1}$$

$$0.7 < (SS+BF)/(DD+BF) < 0.95 \tag{2}$$

$$3.4 < Fno \times (DD+BF)/Y < 8 \tag{3}$$

where f is the focal length of the entire system of the small-size wide angle lens, Y is a maximum image height at an image plane, SS is a distance on an optical axis from the stop to a most-image-side surface in the small-size wide angle lens, BF is a back focus in air, DD is a distance on the optical axis from a most-object-side surface in the small-size wide angle lens to the most-image-side surface in the small-size wide angle lens, and Fno is a maximum aperture.

The maximum image height may be determined, for example, based on the size of a film or an imaging plane of an imaging device arranged at an image plane of an apparatus, such as a camera, when the small-size wide angle lens is applied to the apparatus. For example, when the imaging plane is a rectangle, ½ of the diagonal length of the imaging plane may be regarded as maximum image height Y.

Further, back focus BF in air is a length in air on an optical axis from a most-image-side surface in the lens system to an image plane. Here, the term "lens system" does not include an optical member that has no refractive power. For example, when a parallel flat plate, such as a filter and a cover glass, has been inserted between the most-image-side lens and the image plane, the parallel flat plate is removed, and the back focus BF in air is calculated while a fluctuation of the position of the image plane by removal of the parallel flat plate is considered.

In the descriptions of the distance SS, the back focus BF in air and the distance DD, the term "surface" means a lens surface. Therefore, surfaces of an optical member having no refractive power, for example, such as a parallel flat plate are not included.

In a small-size wide angle lens according to the first aspect of the present invention, it is desirable that a positive lens is arranged at a most-image-side position in the third lens group, and that a negative meniscus lens having a concave surface facing the object side is arranged immediately on the object side of the positive lens arranged at the most-image-side position in the third lens group. The expression "a negative meniscus lens is arranged immediately on the object side of the positive lens" means that the negative meniscus lens is arranged on the object side of the positive lens, and no optical member is arranged between the positive lens and the negative meniscus lens.

When the third lens group includes a positive lens arranged at a most-image-side position in the third lens group and a negative meniscus lens having a concave surface facing the object side, and which is arranged immediately on the object side of the positive lens, it is desirable that the following formulas (4) and (5) are satisfied:

$$1.75 < Nd3n \qquad (4); \text{ and}$$

$$1.8 < Nd3p \qquad (5), \text{ where}$$

Nd3n is the refractive index of the negative meniscus lens in the third lens group with respect to d-line, and Nd3p is the refractive index of the positive lens arranged at the racist-image-side position in the third lens group with respect to d-line.

Further, in a small-size wide angle lens according to the first aspect of the present invention, it is desirable that the second lens group includes a cemented lens composed of a double-concave lens and a double-convex lens, which are cemented together in this order from the object side.

In a small-size wide angle lens according to the first aspect of the present invention, it is desirable that a positive lens is arranged at a most-image-side position in the third lens group, and that a negative meniscus lens having a concave surface facing the object side is arranged immediately on the object side of the positive lens arranged at the most-image-side position in the third lens group, and that an aspheric lens is arranged between the cemented lens in the second lens group and the negative meniscus lens in the third lens group.

When the second lens group includes the cemented lens, it is desirable that the following formulas (6) and (7) are satisfied:

$$1.7 > Nd2n \qquad (6); \text{ and}$$

$$1.8 < Nd2p \qquad (7), \text{ where}$$

Nd2n is the refractive index of the double-concave lens in the second lens group with respect to d-line, and Nd2p is the refractive index of the double-convex lens in the second lens group with respect to d-line.

When the second lens group includes the cemented lens and a positive lens is arranged at a most-image-side position in the third lens group, it is desirable that the following formula (8) is satisfied:

$$1.8 < Ndp \qquad (8), \text{ where}$$

Ndp is an average value of the refractive index, with respect to d-line, of a positive lens having a highest refractive index with respect to d-line as a positive lens in the first lens group, the refractive index of the double-convex lens in the second lens group with respect to d-line, and the refractive index of a most-image-side positive lens in the third lens group with respect to d-line.

In a small-size wide angle lens according to the first aspect of the present invention, it is desirable that focus is adjusted from an infinite distance object to a short distance object by moving the first lens group and the second lens group together as one body toward the object side.

In that case, it is desirable that the following formula (9) is satisfied:

$$0.6 < fG12/f < 0.9 \qquad (9), \text{ where}$$

fG12 is a combined focal length of the first lens group and the second lens group.

In a small-size wide angle lens according to the first aspect of the present invention, the third lens group may substantially consist of two lenses.

In a small-size wide angle lens according to the first aspect of the present invention, it is desirable that the second lens group substantially consists of a positive meniscus lens, a cemented lens composed of a negative lens and a positive lens, and an aspheric lens, which are arranged in this order from the object side.

In a small-size wide angle lens according to the first aspect of the present invention, it is desirable that the first lens group substantially consists of a negative meniscus lens having a convex surface facing the object side and a positive lens having a convex surface facing the object side, which are arranged in this order from the object side. In that case, it is desirable that the negative meniscus lens and the positive lens having the convex surface facing the object side in the first lens group are cemented together.

A small-size wide angle lens according to a second aspect of the present invention is a small-size wide angle lens substantially consisting of:

a first lens group having positive refractive power;

a stop;

a second lens group having positive refractive power; and a third lens group having negative refractive power, which are arranged in this order from the object side of the small-size wide angle lens, wherein the first lens group substantially consists of a cemented lens composed of a negative meniscus lens having a convex surface facing the object side and a positive lens having a convex surface facing the object side, which are cemented together in this order from the object side, and wherein the second lens group substantially consists of a positive meniscus lens, a cemented lens composed of a double-concave lens and a double-convex lens, which are cemented together in this order from the object side, and an aspheric lens, which are arranged in this order from the object side, and wherein the third lens group substantially consists of a negative meniscus lens having a concave surface facing the object side and a positive lens, which are arranged in this order from the object side.

In the small-size wide angle lenses according to the first and second aspects of the present invention and embodiments thereof, when a lens is an aspheric lens, a paraxial region of the aspheric lens is considered to refer to the sign (positive or negative) of the refractive power of the lens and the shape of the lens.

A camera according to the present invention includes a small-size wide angle lens according to the first or second aspect of the present invention.

Further, the expression "a small-size wide angle lens substantially consisting of n lens groups" and the expression "a lens group substantially consisting of n lenses" include small-size wide angle lenses which are equipped with: lenses substantially without any power; optical elements other than lenses, such as apertures and glass covers; and mechanical components, such as lens flanges, lens barrels, imaging elements, and camera shake correcting mechanisms; in addition to the n lens groups or lenses.

According to a small-size wide angle lens according to the first aspect of the present invention, a positive lens group, a positive lens group and a negative lens group are arranged in this order from the object side, and a stop is located closer to the object side. Further, the structure of lenses included in each group is appropriately set, and an aspheric surface is included. Further, predetermined formulas are satisfied. Therefore, it is possible to provide a small lens system having excellent telecentricity, and the size of which has been reduced, while maintaining a small F-number, a wide angle and high performance.

According to a small-size wide angle lens according to the second aspect of the present invention, a positive lens group, a positive lens group and a negative lens group are arranged in this order from the object side, and a stop is located closer to the object side. Further, the details of structure, such as the number of lenses in each lens group and the shape and the refractive power of a lens, are appropriately set. Therefore, it is possible to provide a small lens system having excellent telecentricity, and the size of which has been reduced, while maintaining a small F-number, a wide angle and high performance.

A camera of the present invention includes a small-size wide angle lens according to the first or second aspect of the present invention. Therefore, the camera of the present invention can obtain excellent images at a wide angle of view. Further, it is possible to structure the camera in compact size not only when the camera is carried by a user but when the camera is used for photography.

BRIEF DESCRIPTION OF THE DRAWINGS

FIG. 5 is a cross section of a small-size wide angle lens in Example 4 of the present invention, and which illustrates the structure of the lens and optical paths;

FIG. 6 is a cross section of a small-size wide angle lens in Example 5 of the present invention, and which illustrates the structure of the lens and optical paths;

FIGS. 10A, 10B, 10C and 10D are diagrams illustrating various aberrations of the small-size wide angle lens in Example 4 of the present invention;

FIGS. 11A, 11B, 11C and 11D are diagrams illustrating various aberrations of the small-size wide angle lens in Example 5 of the present invention.

DESCRIPTION OF THE PREFERRED EMBODIMENTS

Figure 1:
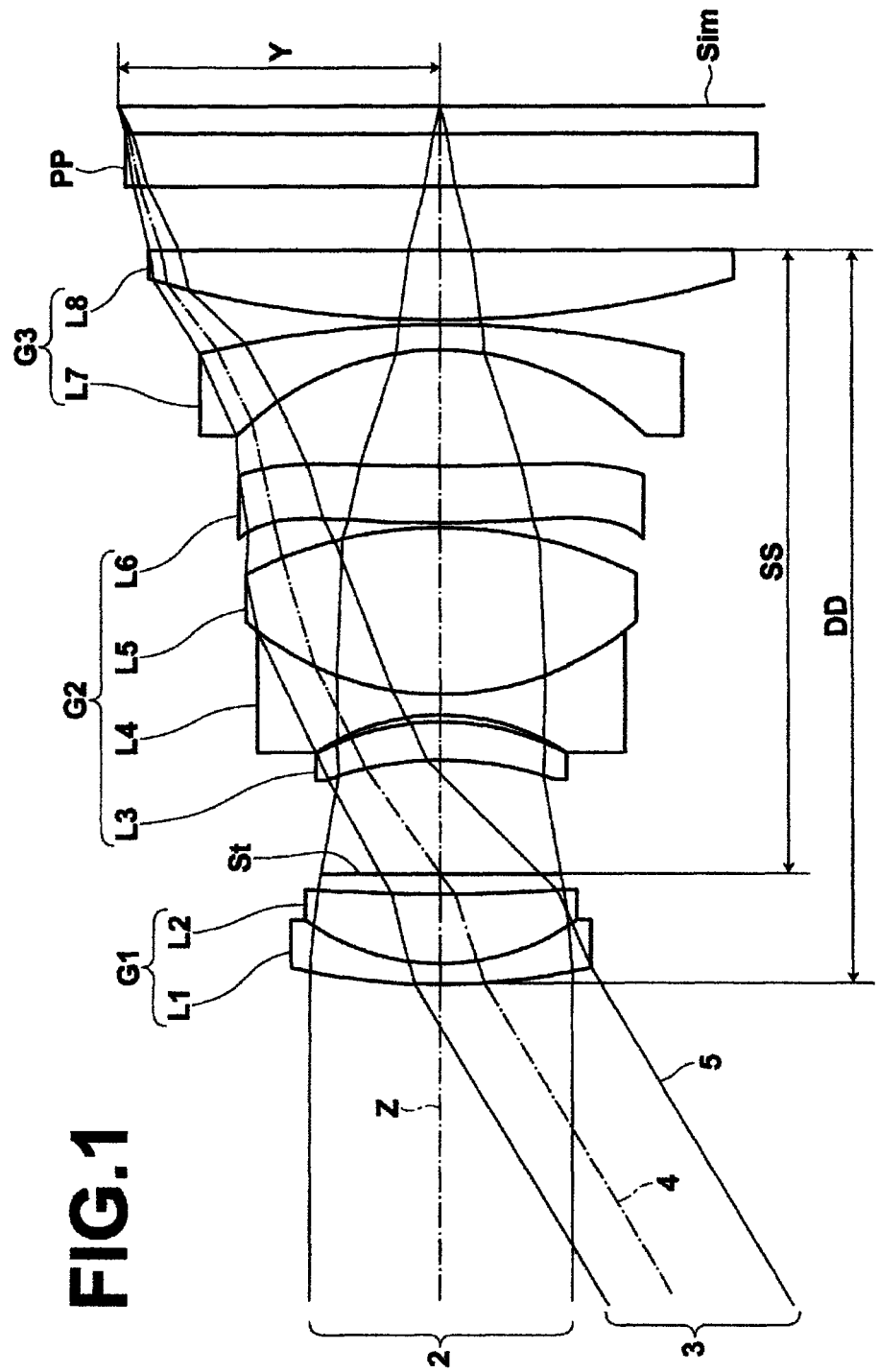
FIG. 1 is a cross section of a small-size wide angle lens according to first and second embodiments of the present invention, and which illustrates the structure of the lens and optical paths.
Figure 2:
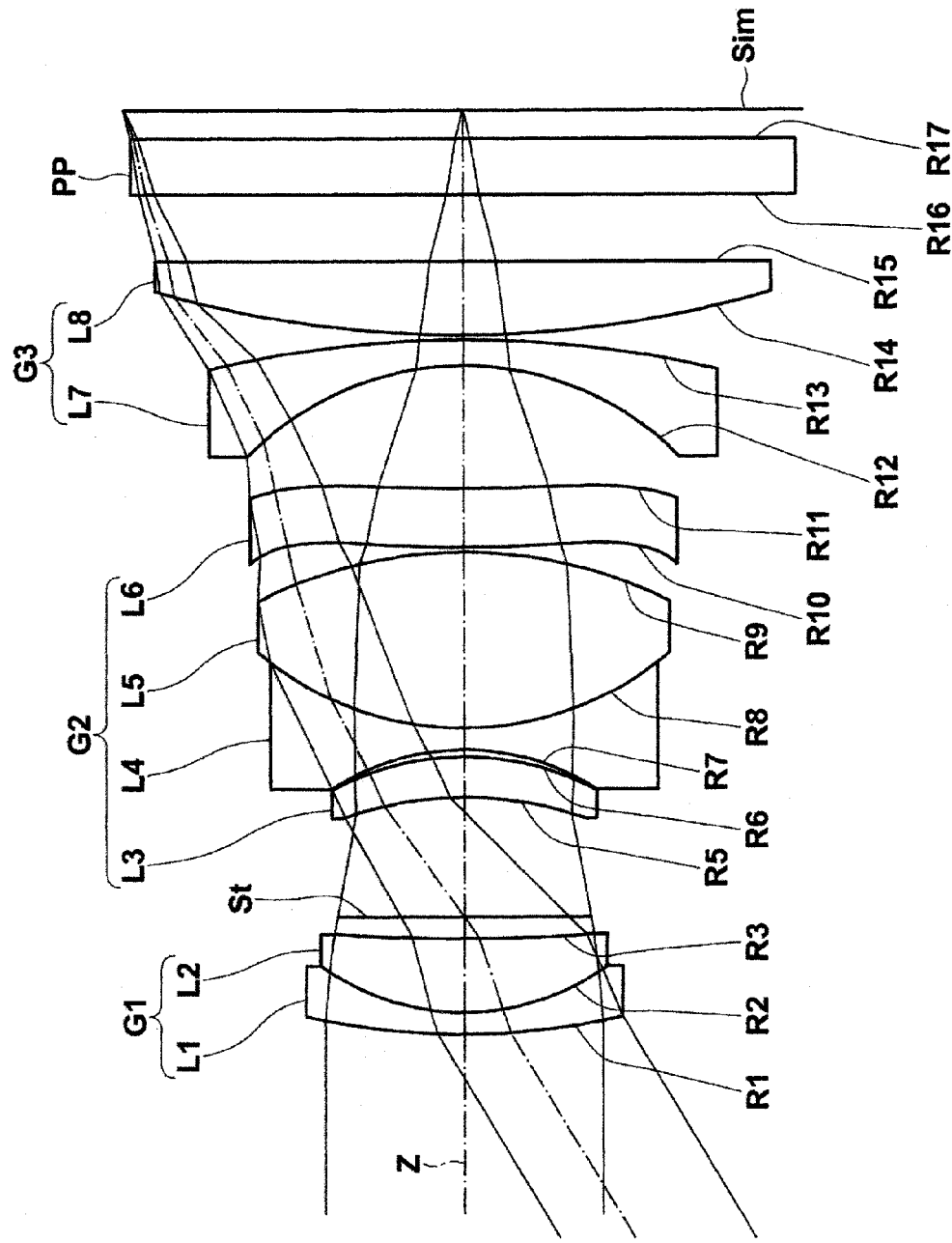
FIG. 2 is a cross section of a small-size wide angle lens in Example 1 of the present invention, and which illustrates the structure of the lens and optical paths.
Figure 3:
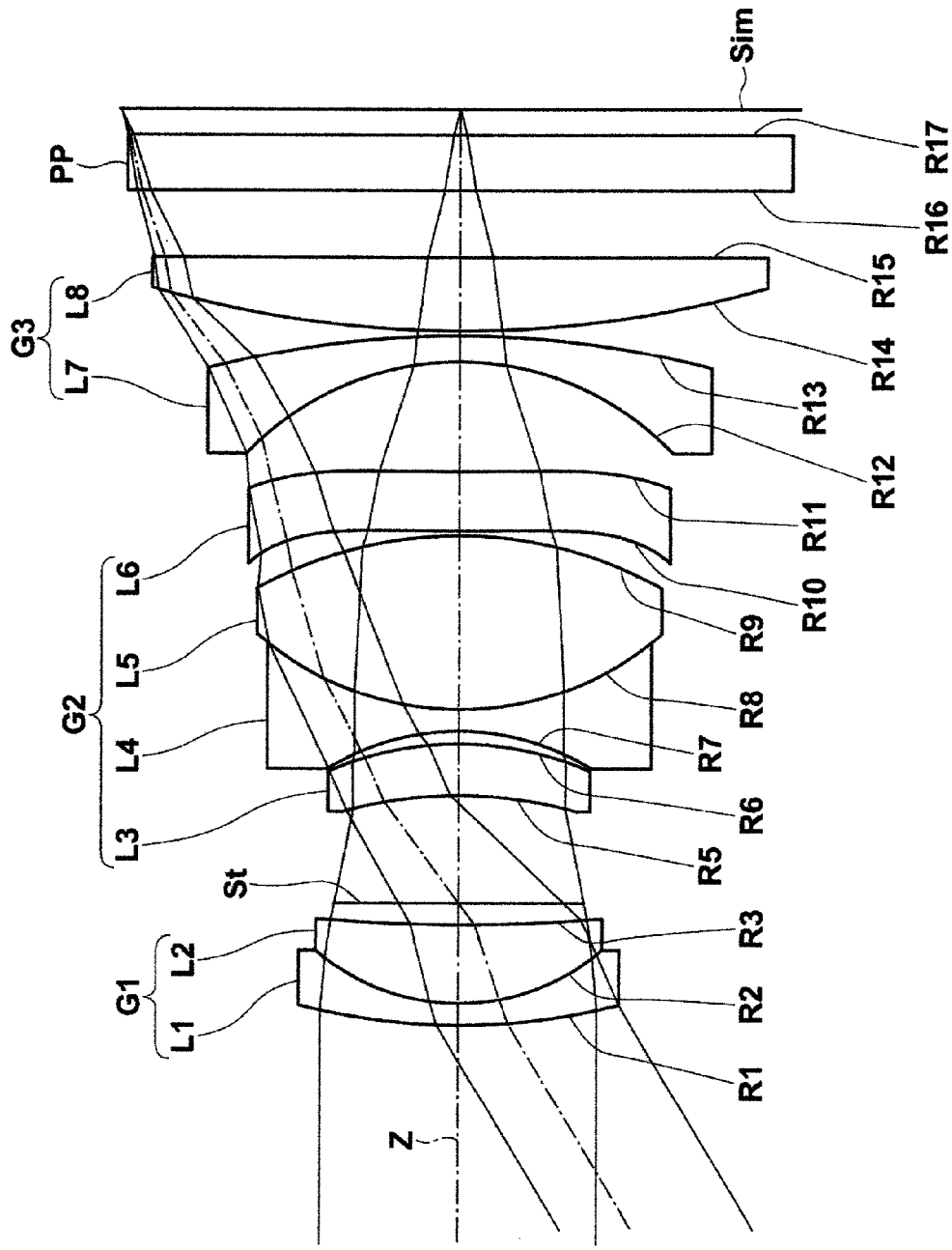
FIG. 3 is a cross section of a small-size wide angle lens in Example 2 of the present invention, and which illustrates the structure of the lens and optical paths.
Figure 4:
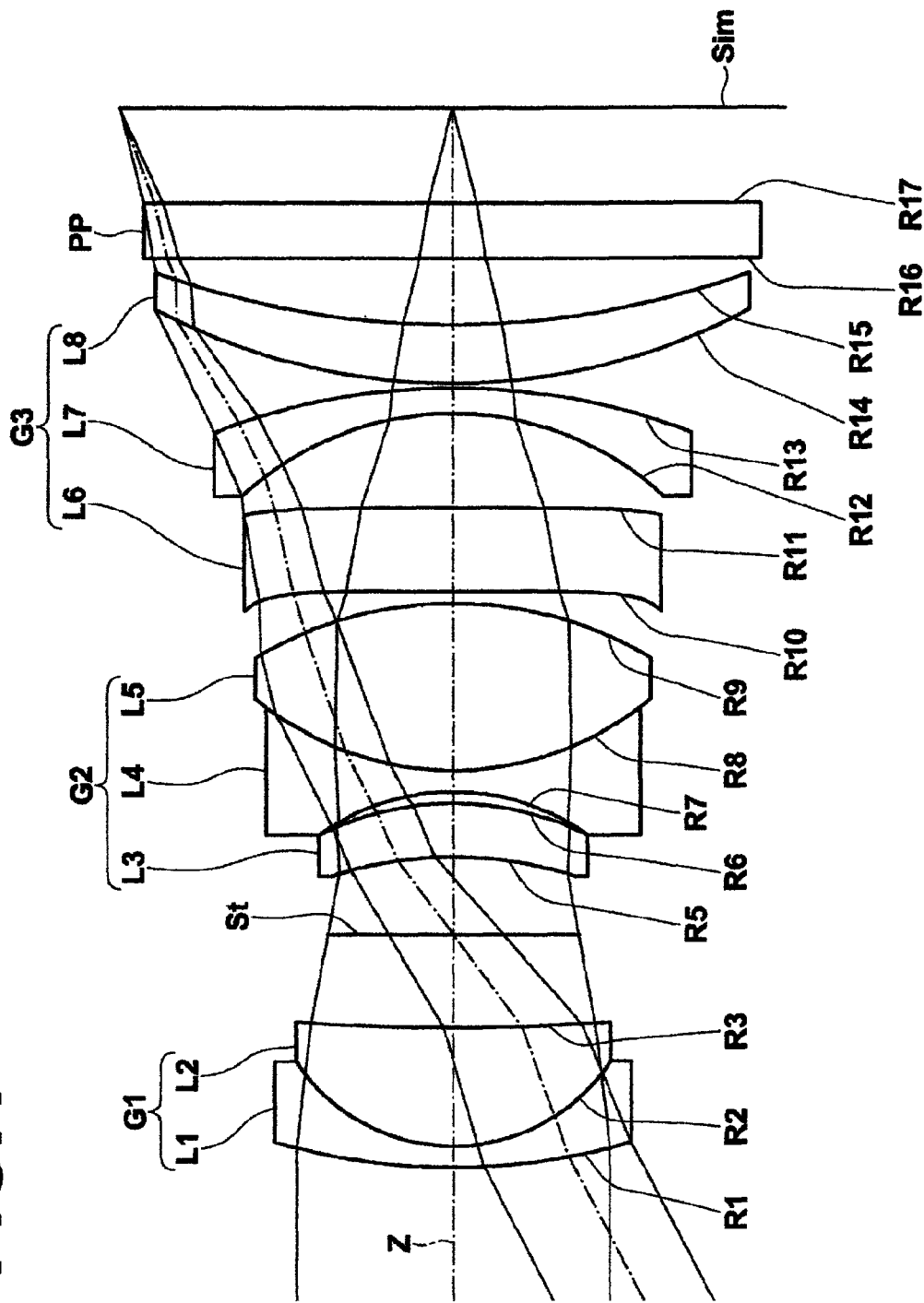
FIG. 4 is a cross section of a small-size wide angle lens in Example 3 of the present invention, and which illustrates the structure of the lens and optical paths.
Figures 7A, 7B, 7C, 7D:
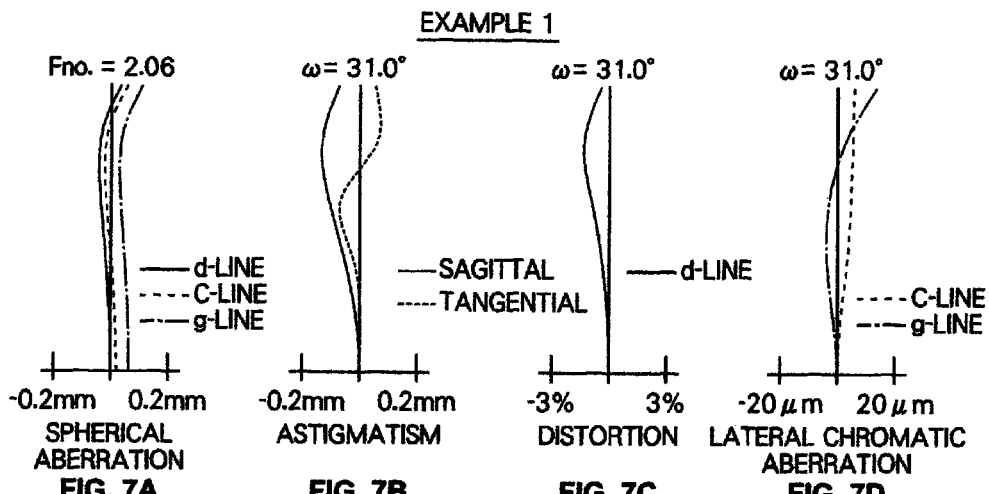
FIGS. 7A, 7B, 7C and 7D are diagrams illustrating various aberrations of the small-size wide angle lens in Example 1 of the present invention.
Figures 8A, 8B, 8C, 8D:
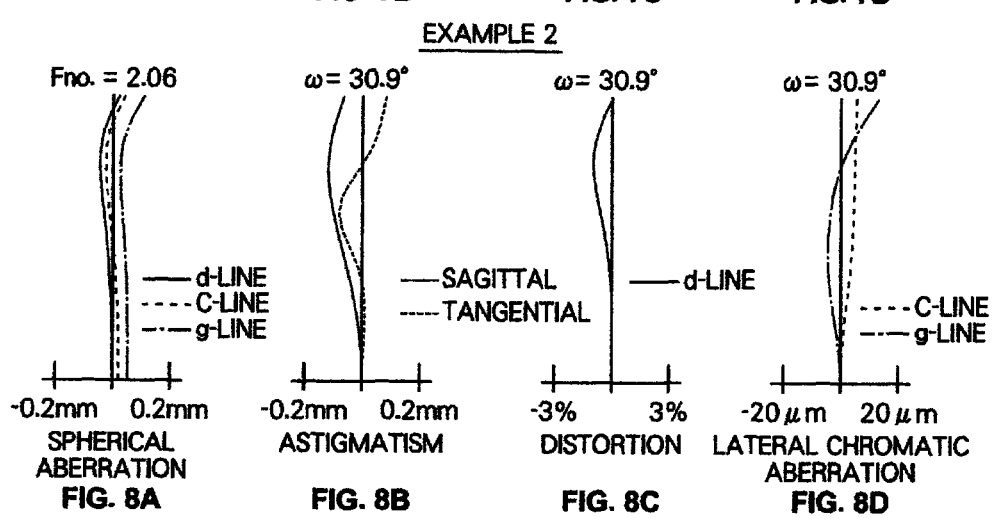
FIGS. 8A, 8B, 8C and 8D are diagrams illustrating various aberrations of the small-size wide angle lens in Example 2 of the present invention.
Figures 9A, 9B, 9C, 9D:
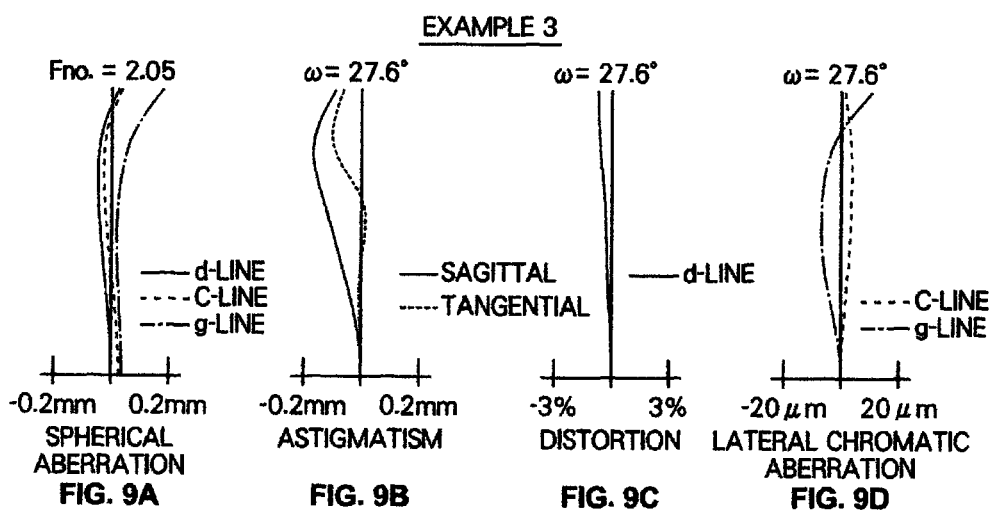
FIGS. 9A, 9B, 9C and 9D are diagrams illustrating various aberrations of the small-size wide angle lens in Example 3 of the present invention.

Hereinafter, embodiments of the present invention will be described with reference drawings. FIG. 1 is a cross section illustrating the structure of a small-size wide angle lens 1 according to a first embodiment of the present invention. The small-size wide angle lens 1 corresponds to Example 1, which will be described later. In FIG. 1, the left side is an object side, and the right side is an image side. Axial rays 2 from an object point at an infinite distance and off-axial rays 3 at a maximum angle of view are also illustrated.

As basic structure, the small-size wide angle lens 1 in the first embodiment of the present invention substantially consists of first lens group G1 having positive refractive power, aperture stop St, second lens group G2 having positive refractive power, and third lens group G3 having negative refractive power, which are arranged along optical axis Z in this order from the object side of the small-size wide angle lens 1. The first lens group G1 includes a negative lens and a positive lens, and the second lens group G2 includes a negative lens and a positive lens. The third lens group G3 includes a negative lens and a positive lens. Further, at least one of the second lens group G2 and the third lens group G3 includes an aspheric surface.

The aperture stop St illustrated in FIG. 1 does not necessarily represent the size nor the shape of the aperture stop St, but represents the position of the aperture stop St on optical axis Z. When this small-size wide angle lens 1 is applied to a camera, it is desirable that a cover glass or various filters are provided based on a structure on the camera side. FIG. 1 illustrates a case in which parallel-flat-plate-shaped optical member PP, which is assumed to be the cover glass or the various filters, is arranged between a most-image-side lens in the small-size wide angle lens 1 and image plane Sim.

In the small-size wide angle lens 1, a compact lens system is realized by adopting telephoto-type arrangement in which a lens group having positive refractive power, a lens group having positive refractive power and a lens group having negative refractive power are arranged in this order from the object side of the small-size wide angle lens 1. Further, a distance between the aperture stop St and image plane Sim becomes long by arranging the aperture stop St closer to the object side of the small-size wide angle lens 1. Further, it is possible to make rays of light enter the image plane Sim at an angle close to 90 degrees to the image plane Sim (perpendicular to the image plane Sim).

Since each of the first lens group G1, the second lens group G2, and the third lens group G3 includes a positive lens and a negative lens, it is possible to easily balance correction of aberrations in each of the lens groups. Further, since an aspheric surface is arranged in at least one of the second lens group G2 and the third lens group G3, which are arranged on the image side of the aperture stop St, it is possible to more easily make off-axial rays enter the image plane Sim at an angle close to 90 degrees to the image plane Sim (perpendicular to the image plane Sim), while correcting spherical aberrations in an excellent manner and achieving a small F-number.

As basic structure, the small-size wide angle lens 1 according to the first embodiment of the present invention satisfies the following formulas (1) through (3):

$$1 < f/Y < 2 \quad (1);$$

$$0.7 < (SS+BF)/(DD+BF) < 0.95 \quad (2); \text{ and}$$

$$3.4 < Fno \times (DD+BF)/Y < 8 \quad (3), \text{ where}$$

f is the focal length of the entire system of the small-size wide angle lens 1, Y is a maximum image height at image plane Sim, SS is a distance on an optical axis from stop St to a most-image-side surface in the small-size wide angle lens 1, BF is a back focus in air, DD is a distance on the optical axis from a most-object-side surface in the small-size wide angle lens 1 to the most-image-side surface in the small-size wide angle lens 1, and Fno is a maximum aperture.

Formula (1) relates to the length of the entire lens system and a display size. When the value of f/Y is lower than the lower limit defined by the formula (1), the lens system becomes a wide angle lens as the focal length becomes short. Consequently, correction of curvature of field becomes difficult. In contrast, when the value of f/Y exceeds the upper limit defined by the formula (1), the focal length becomes long, and the length of the entire lens system including a distance to image plane Sim becomes long. When the upper limit defined by the formula (1) is satisfied, it is possible to make the length of the entire lens system short. For example, it is possible to structure a camera that is compact both in a carried state and in a photography state without using a collapsible mount method. Alternatively, when the upper limit defined by the formula (1) is satisfied, it is possible to structure a collapsible-mount-type camera that is smaller than conventional collapsible-mount-type cameras, and which has excellent portability.

Formula (2) relates to the position of aperture stop St with respect to the entire lens system. When the value of (SS+BF)/(DD+BF) is lower than the lower limit defined by the formula (2), the position of the aperture stop St becomes too close to the image plane Sim. When such a lens system is mounted on a camera, the incident angle (angle of incidence) of rays of light entering an imaging device arranged at image plane Sim (an angle formed by the incident rays of light and a normal to the image plane Sim) becomes large. Consequently, capturing of light by the imaging device becomes difficult. In contrast, when value of (SS+BF)/(DD+BF) exceeds the upper limit defined by the formula (2), a lens space on the object side of the aperture stop St becomes small. Consequently, correction of aberrations caused by rays on the lower side of a pupil becomes difficult. Here, the rays on the lower side of a pupil are, for example, rays that are lower than a principal ray 4 in off-axial rays 3 in FIG. 1, and which are not lower than a lowermost ray 5.

The formula (3) relates to the length of the entire lens system and an F-number. When the value of Fno×(DD+BF)/Y is lower than the lower limit defined by the formula (3), the F-number becomes too small with respect to the length of the entire lens system. Consequently, correction of aberrations, such as spherical aberrations, becomes difficult. In contrast, when the value of Fno×(DD+BF)/Y exceeds the upper limit defined by the formula (3), the length of the entire lens system becomes too long with respect to the F-number. Consequently, it is impossible to reduce the size of the lens system, or to realize an optical system having a small F-number. If the length of the entire lens system is short, it is possible to structure, for example, a camera that is compact both in a carried state and in a photography state without adopting a collapsible mount method. Alternatively, it is possible to structure a collapsible-mount-type camera that is smaller than conventional collapsible-mount-type cameras, and which has excellent portability.

It is desirable that the small-size wide angle lens 1 according to the first embodiment of the present invention includes the following structures in addition to the basic structure as described above. In the embodiments of the present invention, one of the structures may be included. Alternatively, arbitrary plural structures in combination may be included.

As illustrated in FIG. 1, it is desirable that the first lens group G1 includes lens L1 that is a negative meniscus lens having a convex surface facing the object side and lens L2 that is a positive lens having a convex surface facing the object side, which are arranged in this order from the object side. To reduce the size of the lens system, it is desirable that the first lens group G1 consists of only these two lenses. The lens L2 may be, for example, a positive meniscus lens. When the lens L2 is a positive meniscus lens, it is possible to reduce the length of the entire lens system even more, compared with the case in which the lens L2 is a double-convex lens. Further, it is desirable that the lens L1 and the lens L2 in the first lens group G1 are cemented together. The structure in which the lens L1 and the lens L2 are cemented together contributes to a reduction in the length of the entire lens system, compared with the case in which the lens L1 and the lens L2 are not cemented together.

It is desirable that the second lens group G2 includes a cemented lens composed of a double-concave lens and a double-convex lens, which are cemented together in this order from the object side. When a cemented lens is included, correction of chromatic aberrations becomes easy. Further, it is possible to contribute to a reduction in the length of the entire lens system, compared with the case in which the two lenses are not cemented together.

As illustrated in FIG. 1, in the third lens group G3, it is desirable that lens L8 that is a positive lens is arranged at a most-image-side position in the third lens group G3, and that lens L7 is arranged immediately on the object side of the positive lens. The lens L7 is a negative meniscus lens having a concave surface facing the object side. When the third lens group G3 is structured in such a manner, it becomes possible to easily make off-axial rays at a large angle of view enter the image plane Sim at an angle close to 90 degrees to the image plane Sim (perpendicular to the image plane Sim). Specifically, after the off-axial rays are refracted in directions away from optical axis Z by the negative meniscus lens, the off-axial rays are condensed by the positive lens. Consequently, off-axial rays enter the image plane Sim at an angle close to 90 degree to the image plane Sim. The positive lens arranged at a most-image-side position in the third lens group G3 may be a plano-convex lens. Alternatively, the positive lens arranged at the most-image-side position in the third lens group G3 may be a meniscus lens, or a double-convex lens.

To reduce the size of the lens system, it is desirable that the number of lenses is as small as possible. Therefore, it is desirable that the third lens group G3 consists of two lenses of a negative lens and a positive lens.

It is desirable that an aspheric lens is arranged between the cemented lens in the second lens group G2 and the negative meniscus lens in the third lens group G3. It is desirable that a lens system includes an aspheric lens to correct aberrations in an excellent manner, and it is necessary that the aspheric lens is arranged at an appropriate position. If the aspheric lens is arranged on the object side of the cemented lens, excellent correction of curvature of field becomes difficult, compared with the case of arranging the aspheric lens between the cemented lens in the second lens group G2 and the negative meniscus lens in the third lens group G3. If the aspheric lens is arranged on the image side of the negative meniscus lens in the third lens group G3, excellent correction of spherical aberrations becomes difficult, compared with the case of arranging the aspheric lens between the cemented lens in the second lens group G2 and the negative meniscus lens in the third lens group G3.

For example, as illustrated in FIG. 1, the second lens group G2 may have three-group/four-element construction in which lens L3, a cemented lens composed of lenses L4 and L5, and lens L6 are arranged in this order from the object side. The lens L3 is a positive meniscus lens, and the lens L4 is a negative lens, and the lens L5 is a positive lens. Further, the lens L6 is an aspheric lens. When the lens group G2 is structured in this manner, it is possible to correct spherical aberrations and curvature of field in a well-balanced manner.

Alternatively, as illustrated in examples that will be described later, the second lens group G2 may have two-group/three-element construction in which lens L3, and a cemented lens composed of lenses L4 and L5 are arranged in this order from the object side. The lens L3 is a positive meniscus lens, and the lens L4 is a negative lens, and the lens L5 is a positive lens. Further, the third lens group G3 may have three-group/three-element construction in which lenses L6, L7 and L8 are arranged in this order from the object side. The lens L6 is an aspheric lens, and the lens L7 is a negative meniscus lens having a concave surface facing the object side. Further, the lens L8 is a positive lens. When the lens system is structured in this manner, it is possible to reduce a load on a drive mechanism when focus is adjusted by using a front focus method, compared with the case of structuring the second lens group G2 of the three-group/four-element construction. Therefore, the two-group/three-element construction is advantageous to reduction in the size of an apparatus. In the front focus method, the first lens group G1 and the second lens group G2 are moved to adjust focus.

The lens L3 may be a positive meniscus lens having a convex surface facing the image side. Alternatively, the lens L3 may be a positive meniscus lens having a convex surface facing the object side. However, the positive meniscus lens having the convex surface facing the image side can contribute more to reduction in the size of the apparatus. Further, it is desirable that the shape of a paraxial region of the lens L6 is a convex surface facing the object side. For example, the paraxial region of the lens L6 may be one of a positive meniscus shape having a convex surface facing the object side, a double-convex shape, and a negative meniscus shape having a convex surface facing the object side.

When the third lens group G3 includes a positive lens arranged at a most-image-side position in the third lens group G3 and a negative meniscus lens having a concave surface facing the object side, and which is arranged immediately on the object side of the positive lens, it is desirable that these lenses satisfy the following formulas (4) and (5):

$$1.75 < Nd3n \quad (4); \text{ and}$$

$$1.8 < Nd3p \quad (5), \text{ where}$$

Nd3n is the refractive index of the negative meniscus lens in the third lens group G3 with respect to d-line, and Nd3p is the refractive index of the positive lens arranged at the most-image-side position in the third lens group G3 with respect to d-line.

When at least one of the formulas (4) and (5) are not satisfied, control of Petzval sum becomes difficult. Consequently, correction of curvature of field becomes difficult.

When the second lens group G2 includes a cemented lens composed of a double-concave lens and a double-convex lens that are cemented together in this order from the object side, it is desirable that these lenses satisfy the following formulas (6) and (7):

$$1.7 > Nd2n \quad (6); \text{ and}$$

$$1.8 < Nd2p \quad (7), \text{ where}$$

Nd2n is the refractive index of the double-concave lens in the second lens group G2 with respect to d-line, and Nd2p is the refractive index of the double-convex lens in the second lens group G2 with respect to d-line.

When the formulas (6) and (7) are satisfied, it is possible to correct both curvature of field and spherical aberrations in an excellent manner.

Further, when the second lens group G2 includes a double-convex lens that constitutes the cemented lens, and a positive lens is arranged at a most-image-side position in the third lens group G3, it is desirable that these lenses and a positive lens having a highest refractive index with respect to d-line as a positive lens in the first lens group G1 satisfy the following formula (8):

$$1.8 < Ndp \quad (8), \text{ where}$$

Ndp is an average value of the refractive index, with respect to d-line, of a positive lens having a highest refractive index with respect to d-line as a positive lens in the first lens group G1, the refractive index of the double-convex lens in the second lens group G2 with respect to d-line, and the refractive index of a most-image-side positive lens in the third lens group G3 with respect to d-line.

When the formula (8) is not satisfied, control of Petzval sum becomes difficult. If curvature of field is tried to be corrected in an excellent manner in a state in which the formula (8) is not satisfied, it is necessary to increase the length of the entire lens system, and that is disadvantageous to reduction in the size of an apparatus.

Further, in the small-size wide angle lens 1, a front-focus method may be is used to adjust focus. In the front focus method, the first lens group G1 and the second lens group G2 are moved. Specifically, the small-size wide angle lens 1 may be structured in such a manner that the first lens group G1 and the second lens group G2 are moved together as one body toward the object side when focus is adjusted from an infinite distance object to a short distance object. In the small-size wide angle lens 1, aperture stop St is arranged closer to the object side. Therefore, the lens diameters of the first lens group G1 and the second lens group G2 are small, and the weights of the first lens group G2 and the second lens group G2 are relatively light. Adoption of the front-focus method as described above can reduce a load on a drive mechanism, compared with a method of moving all of lens groups and a rear-focus method. In the rear-focus method, an image-side lens group, the lens diameter of which is large, and the weight of which is heavy, is moved. Therefore, adoption of the front-focus method is advantageous to reduction in the size of an apparatus.

When the small-size wide angle lens 1 is structured in such a manner that focus is adjusted by moving the first lens group G1 and the second lens group, it is desirable that the following formula (9) is satisfied:

$$0.6 < fG12/f < 0.9 \quad (9), \text{ where}$$

fG12 is a combined focal length of the first lens group G1 and the second lens group G2.

When the value of fG12/f is lower than the lower limit defined by the formula (9), a fluctuation of aberration during focusing becomes large. When the value of fG12/f exceeds the upper limit defined by the formula (9), movement amounts of the lens groups during adjustment of focus become large, and that is disadvantageous to reduction in the size of an apparatus.

Further, it is desirable that at least one of the following formulas (1-1) through (9-1), or an arbitrary combination thereof is satisfied to achieve more excellent performance. Signs used in the formulas (1-1) through (9-1) are the same as those defined in the formulas (1) through (9), respectively. When the formulas (1-1) through (9-1) are satisfied, it is possible to enhance the advantageous effects achievable by satisfying the formulas (1) through (9), respectively:

$$1.25 < f/Y < 2 \quad (1\text{-}1);$$

$$0.8 < (SS+BF)/(DD+BF) < 0.9 \quad (2\text{-}1);$$

$$4.5 < Fno \times (DD+BF)/Y < 6.7 \quad (3\text{-}1);$$

$$1.8 < Nd3n \quad (4\text{-}1);$$

$$1.85 < Nd3p \quad (5\text{-}1);$$

$$1.65 > Nd2n \quad (6\text{-}1);$$

$$1.85 < Nd2p \quad (7\text{-}1);$$

$$1.85 < Ndp \quad (8\text{-}1); \text{ and}$$

$$0.7 < fG12/f < 0.85 \quad (9\text{-}1).$$

Next, a small-size wide angle lens according to a second embodiment of the present invention will be described. The small-size wide angle lens 1 illustrated in FIG. 1 is an example of the structure of the small-size wide angle lens 1 in the second embodiment.

As basic structure, the small-size wide angle lens 1 in the second embodiment of the present invention substantially consists of first lens group G1 having positive refractive power, aperture stop St, second lens group G2 having positive refractive power, and third lens group G3 having negative refractive power, which are arranged along optical axis Z in this order from the object side of the small-size wide angle lens 1. Further, the first lens group G1 substantially consists of a cemented lens composed of a negative meniscus lens having a convex surface facing the object side and a positive lens having a convex surface facing the object side, which are cemented together in this order from the object side. The second lens group G2 substantially consists of a positive meniscus lens, a cemented lens composed of a double-concave lens and a double-convex lens that are cemented together in this order from the object side, and an aspheric lens, which are arranged in this order from the object side. The third lens group G3 substantially consists of a negative meniscus lens having a concave surface facing the object side and a positive lens, which are arranged in this order from the object side.

The structure of the small-size wide angle lens according to the second embodiment is partially the same as the small-size wide angle lens according to the first embodiment and the embodiments thereof. Therefore, with respect to the same structure, a part of descriptions of the actions and effects of the small-size wide angle lens according to the second embodiment will be omitted, because they are the same as those described in the first embodiment.

In the small-size wide angle lens 1 according to the second embodiment, a lens group having positive refractive power, a lens group having positive refractive power and a lens group having negative refractive power are arranged in this order from the object side. Such arrangement of the refractive powers of the lens groups is advantageous to reduction in the size of an apparatus. Further, since the aperture stop St is arranged closer to the object side, it is possible to make rays of light enter image plane Sim at an angle close to 90 degrees to the image plane Sim. Further, the structure of lenses included in each group is optimized, and the number of lenses is reduced as much as possible to reduce the size of an apparatus.

Especially, when the second lens group G2 is structured as described above, it is possible to correct spherical aberrations and curvature of field in a well-balanced manner, while reducing the size of the lens system. Further, it is possible to correct chromatic aberrations in an excellent manner. Further, when the third lens group G3 is structured as described above, it is possible to make off-axial rays at a large angle of view enter image plane Sim at an angle close to 90 degrees to the image plane Sim, while structuring the lens system in small size.

In the small-size wide angle lens according to the second embodiment, desirable or adoptable structures described in the small-size wide angle lens according to the first embodiment may be adopted. For example, in the small-size wide angle lens 1 according to the second embodiment, it is desirable that one of the formulas (1) through (9) and formulas (1-1) through (9-1), which were described in the first embodiment, or an arbitrary combination thereof is satisfied. Further, in the small-size wide angle lens according to the second embodiment, a front-focus method may be used to adjust focus. In the front focus method, the first lens group G1 and the second lens group G2 are moved. The small-size wide angle lens 1 may be structured in such a manner that the first lens group G1 and the second lens group G2 are moved together as one body toward the object side when focus is adjusted from an infinite distance object to a short distance object.

The small-size wide angle lens according to the first and second embodiments of the present invention may be used as a single focal lens, the focal length of which is fixed. For example, the small-size wide angle lens has an F-number of 2.0, which is a large aperture ratio, and the full angle of view is approximately 60°, which is wide. Further, the size of the small-size wide angle lens is very small, and the telecentricity of the small-size wide angle is high. Therefore, it is possible to achieve high optical performance in which high-image-quality images are obtainable.

Figure 12:
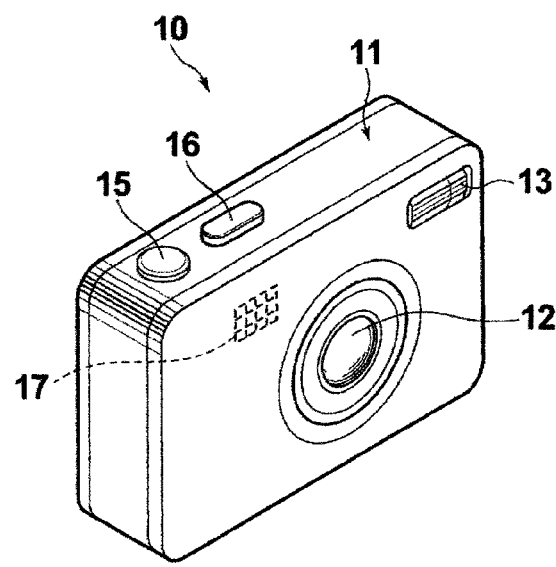
FIG. 12 is a perspective view illustrating the structure of a camera according to an embodiment of the present invention.

FIG. 12 is a perspective view illustrating an example of a camera according to an embodiment of the present invention. A camera 10 illustrated in FIG. 12 is a compact digital camera. A small-size wide angle lens 12 according to an embodiment of the present invention is provided on the front side and in the inside of the camera body 11. Further, a flash light output apparatus 13 for outputting flash light to a subject is provided on the front side of the camera body 11, and a shutter button 15 and a power source button 16 are provided on the upper side of the camera body 11. Further, an imaging device 17 is provided in the camera body 11. The imaging device 17 images an optical image formed by the small-size wide angle lens 12, and converts the optical image into electrical signals. For example, the imaging device 17 is composed of a CCD, a CMOS or the like.

As described above, the small-size wide angle lens 12 according to the embodiment of the present invention is very small. Therefore, the camera is compact both in a carried state and in a photography state without using the collapsible mount method. Alternatively, when a collapsible mount method is adopted, it is possible to obtain a camera the size of which is smaller than conventional collapsible-mount-type cameras, and which has excellent portability.

Next, examples of numerical values of the small-size wide angle lens of the present invention will be described. FIGS. 2 through 6 are cross-sections of small-size wide angle lenses in Examples 1 through 5, respectively. In FIGS. 2 through 6, the left side is the object side, and the right side is the image side. In FIGS. 2 through 6, axial rays from an object point at an infinite distance and off-axial rays at a maximum angle of view are also illustrated. However, signs of these rays of light are omitted. Further, in FIGS. 2 through 6, parallel-flat-plate-shaped optical member PP, which assumes a cover glass or various filters, is also illustrated. In FIGS. 2 through 6, aperture stop St does not necessarily represent the size nor the shape of the aperture stop St. The aperture stop St represents the position of the aperture stop St on optical axis Z.

In Examples 1 and 2, the first lens group G1 is composed of two lenses, namely, lenses L1 and L2. The second lens group G2 is composed of four lenses, namely, lenses L3 through L6. The third lens group G3 is composed of two lenses, namely, lenses L7 and L8. In Examples 3 through 5, the first lens group G1 is composed of two lenses, namely, lenses L1 and L2. The second lens group G2 is composed of three lenses, namely, lenses L3 through L5. The third lens group G3 is composed of three lenses, namely, lenses L6 through L8.

Table 1 shows basic lens data about the small-size wide angle lens in Example 1. Table 2 shows aspheric surface data about the small-size wide angle lens in Example 1. Similarly, Tables 4 through 10 show basic lens data and aspheric surface data about the small-size wide angle lenses in Examples 2 through 5. In the following descriptions, the meanings of signs in the tables will be described by using Example 1 as an example. The meanings of the signs in Examples 2 through 5 are similar to those of Examples 1.

In the basic lens data of Table 1, column Si shows the surface number of the i-th surface (i=1, 2, 3, . . . ). The most object-side surface of elements constituting the lens system is the first surface, and surface numbers sequentially increase toward the image side. Further, column Ri shows the radius of curvature of the i-th surface, and column Di shows a distance on optical axis Z between the i-th surface and (i+1)th surface. The sign (positive/negative) of the radius of curvature is positive when the surface is convex toward the object side, and negative when the surface is convex toward the image side.

In the lens data, column Ndj shows the refractive index of a j-th optical element (j=1, 2, 3, . . . ) for d-line (wavelength is 587.6 nm). The most-object-side lens is the first optical element, and the number j sequentially increases toward the image side. Further, the column νdj shows the Abbe number of the j-th optical element for d-line. The lens data includes aperture stop St and optical member PP. In the column Si of surface number, the term "(aperture stop)" is also written in a row corresponding to the aperture stop St.

In the basic lens data of Table 1, the mark "*" is attached to the surface numbers of aspheric surfaces. Table 1 shows a paraxial radius of curvature, as a radius of curvature of an aspheric surface. Further, the aspheric surface data in Table 2 show surface numbers of aspheric surfaces and aspheric coefficients related to the aspheric surfaces, respectively. In the numerical values of aspheric surface data in Table 2, the expression "E-n" (n: integer) means "$\times 10^{-n}$", and the expression "E+n" means "$\times 10^{n}$". The aspheric coefficients are values of coefficients K, Am (m=3, 4, 5 . . . 20) in the following aspheric surface equation (A). Further, the sign "Σ" in the aspheric surface equation (A) means a sum with respect to the term of "m":

$$Zd = C \cdot h^2 / \{1 + (1 - K \cdot C^2 \cdot h^2)^{1/2}\} + \Sigma Am \cdot h^m \quad \text{(A)}$$

Zd: the depth of an aspheric surface (the length of a perpendicular from a point on the aspheric surface at height h to a flat plane that is in contact with the vertex of the aspheric surface and perpendicular to an optical axis), h: height (a distance from the optical axis to a lens surface), C: a paraxial radius of curvature, and K, Am: aspheric coefficients (m=3, 4, 5 . . . 20).

TABLE 1

EXAMPLE 1 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 1 | 29.787 | 0.91 | 1.74077 | 27.8 |
| 2 | 10.216 | 3.07 | 1.88300 | 40.8 |
| 3 | 85.567 | 0.90 | | |
| 4 (APERTURE STOP) | ∞ | 5.01 | | |
| 5 | −15.211 | 1.70 | 1.88300 | 40.8 |
| 6 | −11.699 | 0.30 | | |
| 7 | −10.059 | 0.91 | 1.59270 | 35.3 |
| 8 | 13.211 | 7.36 | 1.88300 | 40.8 |
| 9 | −18.976 | 0.20 | | |
| *10 | 47.945 | 2.50 | 1.56865 | 58.6 |
| *11 | 89.234 | 5.13 | | |
| 12 | −12.593 | 1.10 | 1.80809 | 22.8 |
| 13 | −45.060 | 0.20 | | |
| 14 | 46.628 | 3.08 | 1.88300 | 40.8 |
| 15 | ∞ | 2.80 | | |
| 16 | ∞ | 2.33 | 1.51680 | 64.2 |
| 17 | ∞ | | | |

TABLE 2

EXAMPLE 1 ASPHERIC SURFACE DATA

| SURFACE NUMBER | 10 | 11 |
|---|---|---|
| K | 0.0000000E+00 | 0.0000000E+00 |
| A3 | 1.3592650E−04 | −3.6381176E−04 |
| A4 | 3.7162356E−06 | 1.5137686E−03 |
| A5 | −6.5383916E−05 | −1.4708597E−03 |
| A6 | 1.2224508E−05 | 6.8718645E−04 |
| A7 | −6.7024023E−07 | −1.7619011E−04 |
| A8 | −7.0851318E−08 | 2.2970993E−05 |
| A9 | −1.4834043E−09 | −1.2455617E−06 |
| A10 | 4.6943650E−10 | 1.7608222E−07 |
| A11 | 7.0944713E−11 | −6.3140576E−08 |
| A12 | 4.0056802E−12 | 5.2054679E−09 |
| A13 | −2.5358331E−13 | 6.6772864E−10 |
| A14 | −6.2786396E−14 | −9.4611209E−11 |
| A15 | −7.2519329E−15 | −3.2254692E−12 |
| A16 | −6.2665147E−16 | 5.9858623E−13 |
| A17 | −1.2454499E−16 | 2.3337864E−14 |
| A18 | 7.5045399E−18 | −1.1788037E−15 |
| A19 | 9.4871080E−18 | −3.5021994E−16 |
| A20 | −7.9734604E−19 | 1.8725398E−17 |

TABLE 3

EXAMPLE 2 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 1 | 27.343 | 0.91 | 1.72825 | 28.5 |
| 2 | 9.197 | 3.26 | 1.88300 | 40.8 |
| 3 | 69.150 | 0.90 | | |
| 4 (APERTURE STOP) | ∞ | 4.53 | | |
| 5 | −17.718 | 2.17 | 1.88300 | 40.8 |
| 6 | −13.534 | 0.53 | | |
| 7 | −10.422 | 0.91 | 1.59270 | 35.3 |
| 8 | 12.968 | 7.26 | 1.88300 | 40.8 |
| 9 | −17.423 | 0.20 | | |
| *10 | 209.560 | 2.50 | 1.69098 | 52.9 |
| *11 | 222.280 | 4.60 | | |
| 12 | −12.378 | 1.10 | 1.80809 | 22.8 |
| 13 | −41.486 | 0.20 | | |
| 14 | 46.912 | 3.06 | 1.88300 | 40.8 |
| 15 | ∞ | 2.80 | | |
| 16 | ∞ | 2.33 | 1.51680 | 64.2 |
| 17 | ∞ | | | |

TABLE 4

EXAMPLE 2 ASPHERIC SURFACE DATA

| SURFACE NUMBER | 10 | 11 |
|---|---|---|
| K | 0.0000000E+00 | 0.0000000E+00 |
| A3 | 1.5387555E−03 | 2.0469475E−03 |
| A4 | −1.0083693E−03 | −1.1954551E−03 |
| A5 | 2.5302484E−04 | 2.8785088E−04 |
| A6 | −3.7318858E−05 | −3.6269736E−05 |
| A7 | 1.2445779E−06 | 1.0269057E−06 |
| A8 | 1.7628586E−07 | 7.6926863E−08 |
| A9 | −2.2567650E−09 | 4.4207274E−09 |
| A10 | −1.3165662E−09 | 2.5592898E−11 |
| A11 | −7.4020544E−11 | −4.7317498E−11 |
| A12 | 2.2800065E−12 | −6.6634650E−12 |
| A13 | 6.8038651E−13 | −3.9103897E−13 |
| A14 | 5.4081154E−14 | 1.0351808E−14 |
| A15 | −2.6496639E−16 | 5.0304164E−15 |
| A16 | −3.0600663E−16 | 3.2824990E−16 |
| A17 | 3.3201824E−17 | 6.0133134E−17 |
| A18 | 5.6387536E−18 | 2.1900407E−18 |
| A19 | −1.7292708E−19 | −2.6472656E−19 |
| A20 | −1.0548607E−19 | −6.9192484E−20 |

TABLE 5

EXAMPLE 3 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 1 | 27.476 | 0.91 | 1.80100 | 35.0 |
| 2 | 8.028 | 5.02 | 1.83481 | 42.7 |
| 3 | 93.997 | 3.93 | | |
| 4 (APERATURE STOP) | ∞ | 3.29 | | |
| 5 | −16.894 | 2.30 | 1.83481 | 42.7 |
| 6 | −12.627 | 0.49 | | |
| 7 | −9.794 | 0.91 | 1.59270 | 35.3 |
| 8 | 13.214 | 7.08 | 1.83481 | 42.7 |
| 9 | −16.648 | 0.50 | | |
| *10 | 377.960 | 3.59 | 1.69350 | 53.2 |
| *11 | −553.780 | 3.99 | | |
| 12 | −13.326 | 1.10 | 1.76182 | 26.5 |
| 13 | −28.134 | 0.20 | | |
| 14 | 27.317 | 2.49 | 1.83481 | 42.7 |
| 15 | 38.133 | 2.80 | | |
| 16 | ∞ | 2.33 | 1.51680 | 64.2 |
| 17 | ∞ | | | |

TABLE 6

EXAMPLE 3 ASPHERIC SURFACE DATA

| SURFACE NUMBER | 10 | 11 |
|---|---|---|
| K | 0.0000000E+00 | 0.0000000E+00 |
| A3 | −6.6965837E−04 | −1.5416151E−03 |
| A4 | 3.9313650E−04 | 2.0514481E−03 |
| A5 | −1.3659964E−04 | −1.5595949E−03 |
| A6 | 2.1878484E−05 | 6.9343117E−04 |
| A7 | −1.3010332E−06 | −1.7579514E−04 |
| A8 | −5.7622762E−08 | 2.2938492E−05 |
| A9 | 6.1319096E−10 | −1.2474966E−06 |
| A10 | 5.2758464E−10 | 1.7599233E−07 |
| A11 | 6.2675907E−11 | −6.3141830E−08 |
| A12 | 2.2249927E−12 | 5.2062503E−09 |
| A13 | −4.5830779E−13 | 6.6786641E−10 |
| A14 | −7.6227500E−14 | −9.4598795E−11 |
| A15 | −6.9575454E−15 | −3.2251128E−12 |
| A16 | −3.8512124E−16 | 5.9849831E−13 |
| A17 | −8.3667533E−17 | 2.3319415E−14 |
| A18 | 1.1460958E−17 | −1.1807126E−15 |
| A19 | 9.5111154E−18 | −3.5026568E−16 |
| A20 | −8.8840709E−19 | 1.8755592E−17 |

TABLE 7

EXAMPLE 4 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 1 | 13.670 | 0.91 | 1.84666 | 23.8 |
| 2 | 8.820 | 2.51 | 1.88300 | 40.8 |
| 3 | 21.860 | 0.90 | | |
| 4 (APERTURE STOP) | ∞ | 2.45 | | |
| 5 | −21.200 | 1.70 | 1.83481 | 42.7 |
| 6 | −11.630 | 0.22 | | |
| 7 | −10.080 | 0.91 | 1.59270 | 35.3 |
| 8 | 10.900 | 5.52 | 1.88300 | 40.8 |
| 9 | −15.910 | 0.50 | | |
| *10 | 58.910 | 2.50 | 1.69350 | 53.2 |
| *11 | 12.620 | 4.36 | | |
| 12 | −12.500 | 1.10 | 1.92286 | 18.9 |
| 13 | −22.720 | 0.20 | | |
| 14 | 71.980 | 4.09 | 1.88300 | 40.8 |
| 15 | −46.800 | 2.80 | | |
| 16 | ∞ | 2.33 | 1.51680 | 64.2 |
| 17 | ∞ | | | |

TABLE 8

EXAMPLE 4 ASPHERIC SURFACE DATA

| SURFACE NUMBER | 10 | 11 |
|---|---|---|
| K | 0.0000000E+00 | 0.0000000E+00 |
| A3 | −5.7845399E−04 | −1.5775636E−03 |
| A4 | −3.1114502E−04 | 1.4693119E−03 |
| A5 | −1.3052687E−04 | −1.5715255E−03 |
| A6 | 2.4222186E−05 | 6.9870641E−04 |
| A7 | −1.5361505E−06 | −1.7543789E−04 |
| A8 | −6.3113952E−08 | 2.2915458E−05 |
| A9 | 1.4739312E−09 | −1.2505665E−06 |
| A10 | 9.4475152E−10 | 1.7587861E−07 |
| A11 | 1.3608174E−10 | −6.3133824E−08 |
| A12 | 7.1522887E−12 | 5.2081152E−09 |
| A13 | −1.1244077E−12 | 6.6806378E−10 |
| A14 | −3.2802709E−13 | −9.4587663E−11 |
| A15 | −4.8052840E−14 | −3.2257234E−12 |
| A16 | −4.1625587E−15 | 5.9830787E−13 |
| A17 | −5.2638979E−17 | 2.3276506E−14 |
| A18 | 9.2147146E−17 | −1.1841488E−15 |
| A19 | 2.4133373E−17 | −3.5027018E−16 |
| A20 | −9.5124792E−19 | 1.8859958E−17 |

TABLE 9

EXAMPLE 5 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 1 | 11.420 | 0.91 | 1.84666 | 23.8 |
| 2 | 7.329 | 2.76 | 1.88300 | 40.8 |
| 3 | 13.040 | 1.30 | | |
| 4 (APERTURE STOP) | ∞ | 1.25 | | |
| 5 | 15.810 | 1.70 | 1.83481 | 42.7 |
| 6 | 23.250 | 1.32 | | |
| 7 | −16.900 | 0.91 | 1.59270 | 35.3 |
| 8 | 11.560 | 4.96 | 1.88300 | 40.8 |
| 9 | −18.040 | 0.50 | | |
| *10 | 888.560 | 2.50 | 1.69350 | 53.2 |
| *11 | 24.990 | 3.72 | | |
| 12 | −12.500 | 1.10 | 1.92286 | 18.9 |
| 13 | −20.560 | 0.20 | | |
| 14 | 42.060 | 3.17 | 1.88300 | 40.8 |
| 15 | 615.400 | 2.80 | | |

TABLE 9-continued

EXAMPLE 5 BASIC LENS DATA

| Si SURFACE NUMBER | Ri RADIUS OF CURVATURE | Di DISTANCE BETWEEN SURFACES | Ndj REFRACTIVE INDEX | νdj Abbe NUMBER |
|---|---|---|---|---|
| 16 | ∞ | 2.33 | 1.51680 | 64.2 |
| 17 | ∞ | | | |

TABLE 10

EXAMPLE 5 ASPHERIC SURFACE DATA

| SURFACE NUMBER | 10 | 11 |
|---|---|---|
| K | 0.0000000E+00 | 0.0000000E+00 |
| A3 | −3.3901719E−04 | −1.0834550E−03 |
| A4 | −2.7420770E−04 | 1.3881290E−03 |
| A5 | −1.2706151E−04 | −1.4949587E−03 |
| A6 | 2.8192771E−05 | 6.8663603E−04 |
| A7 | −2.5740880E−06 | −1.7544353E−04 |
| A8 | −1.0321955E−07 | 2.2965022E−05 |
| A9 | 7.4809013E−09 | −1.2476081E−06 |
| A10 | 1.8672494E−09 | 1.7590763E−07 |
| A11 | 2.0288672E−10 | −6.3143435E−08 |
| A12 | 9.3873155E−12 | 5.2070299E−09 |
| A13 | −1.2812680E−12 | 6.6798868E−10 |
| A14 | −3.6673512E−13 | −9.4591369E−11 |
| A15 | −5.2833973E−14 | −3.2258211E−12 |
| A16 | −4.6366043E−15 | 5.9831308E−13 |
| A17 | −9.4532187E−17 | 2.3277621E−14 |
| A18 | 8.8707068E−17 | −1.1840302E−15 |
| A19 | 2.3868544E−17 | −3.5026000E−16 |
| A20 | −9.7150531E−19 | 1.8860737E−17 |

Table 11 shows specifications of the small-size wide angle lenses in Examples 1 through 5, values related to formulas, and values corresponding to formulas (1) through (9). In Table 11, f is the focal length of the entire system, and BF is a distance on an optical axis from a most-image-side surface to an image plane (back focus in air). Further, 2ω is a full angle of view, and Fno. is an F-number. Further, DD, SS, Y, and fG12 are those explained in the descriptions of the formulas. All of Examples 1 through 5 satisfy the formulas (1) through (9).

TABLE 11

| | EXAMPLE 1 | EXAMPLE 2 | EXAMPLE 3 | EXAMPLE 4 | EXAMPLE 5 |
|---|---|---|---|---|---|
| f | 23.72 | 23.70 | 27.31 | 23.12 | 23.45 |
| BF | 5.53 | 5.41 | 8.38 | 5.03 | 5.04 |
| 2ω | 62.0 | 61.8 | 55.2 | 63.4 | 62.6 |
| Fno | 2.06 | 2.06 | 2.05 | 2.05 | 2.05 |
| DD | 32.37 | 32.13 | 35.80 | 27.87 | 26.30 |
| SS | 27.49 | 27.06 | 25.94 | 23.55 | 21.33 |
| Y | 14.2 | 14.2 | 14.2 | 14.2 | 14.2 |
| fG12 | 19.25 | 19.32 | 23.64 | 14.65 | 16.81 |
| FORMULA (1) f/Y | 1.670 | 1.669 | 1.923 | 1.628 | 1.651 |
| FORMULA (2) (SS + BF)/(DD + BF) | 0.871 | 0.865 | 0.777 | 0.869 | 0.841 |
| FORMULA (3) Fno × (DD + BF)/Y | 5.498 | 5.446 | 6.378 | 4.750 | 4.524 |
| FORMULA (4) Nd3n | 1.80809 | 1.80809 | 1.76182 | 1.92286 | 1.92286 |
| FORMULA (5) Nd3p | 1.88300 | 1.88300 | 1.83481 | 1.88300 | 1.88300 |
| FORMULA (6) Nd2n | 1.59270 | 1.59270 | 1.59270 | 1.59270 | 1.59270 |
| FORMULA (7) Nd2p | 1.88300 | 1.88300 | 1.83481 | 1.88300 | 1.88300 |
| FORMULA (8) Ndp | 1.88300 | 1.88300 | 1.83481 | 1.88300 | 1.88300 |
| FORMULA (9) fG12/f | 0.812 | 0.815 | 0.866 | 0.634 | 0.717 |

In Table 11, the unit of "2ω" is degree, and the unit of length is "mm". However, the unit is only an example, because an optical system is usable by being proportionally enlarged or by being proportionally reduced in size. Therefore, other appropriate units may be used. Further, the values in the tables are rounded to predetermined decimal places.

FIGS. 7A through 7D, 8A through 8D, 9A through 9D, 10A through 10D and 11A through 11D are diagrams illustrating various aberrations of small-size wide angle lenses in Examples 1 through 5.

FIGS. 7A, 7B, 7C and 7D are diagrams illustrating aberrations of the small-size wide angle lens in Example 1 (spherical aberrations, astigmatism, distortion and lateral chromatic aberrations, respectively). In the diagram illustrating spherical aberrations, Fno. represents an F-number, and in the other diagrams illustrating aberrations, ω represents a half angle of view. The diagram illustrating distortion illustrates a shift amount from an ideal image height f×tan(φ) by using focal length f of the entire system and angle φ of view (φ is a variable, 0≤φ≤ω). Each of the diagrams illustrates aberrations by using d-line (wavelength is 587.56 nm) as a base wavelength. In the diagrams illustrating spherical aberrations and lateral chromatic aberrations, aberrations with respect to C-line (wavelength is 656.27 nm) and aberrations with respect to g-line (wavelength is 435.8 nm) are also illustrated. FIGS. 8A through 8D, 9A through 9D, 10A through 10D, and 11A through 11D are illustrated in a similar manner to FIGS. 7A through 7D.

So far, the present invention has been described by presenting embodiments and examples. However, the present invention is not limited to the aforementioned embodiments and examples, and various modifications are possible without departing from the gist of the present invention. For example, the values of the radius of curvature of each lens, a distance between surfaces, a refractive index, an Abbe number, and aspheric coefficients are not limited to the values in the numerical examples, and may be other values.

In the embodiment of the present invention as a camera, a case of applying the present invention to a compact digital camera was described. However, the use of the present invention is not limited to the compact digital camera. For example, the present invention may be applied to a video camera, a film camera or the like.

What is claimed is:

1. A small-size wide angle lens substantially consisting of:
a first lens group having positive refractive power;
a stop;
a second lens group having positive refractive power; and
a third lens group having negative refractive power, which are arranged in this order from the object side of the small-size wide angle lens,
wherein the first lens group includes a negative lens and a positive lens, and
wherein the second lens group includes a negative lens and a positive lens, and
wherein the third lens group includes a negative lens and a positive lens, and
wherein at least one of the second lens group and the third lens group includes an aspheric surface, and
wherein the following formulas (1) through (3) are satisfied:

$$1 < f/Y < 2 \quad (1);$$

$$0.7 < (SS+BF)/(DD+BF) < 0.95 \quad (2); \text{ and}$$

$$3.4 < Fno \times (DD+BF)/Y < 8 \quad (3), \text{ where}$$

f is the focal length of the entire system of the small-size wide angle lens,
Y is a maximum image height at an image plane,
SS is a distance on an optical axis from the stop to a most-image-side surface in the small-size wide angle lens,
BF is a back focus in air,
DD is a distance on the optical axis from a most-object-side surface in the small-size wide angle lens to the most-image-side surface in the small-size wide angle lens, and
Fno is a maximum aperture.

2. A small-size wide angle lens, as defined in claim 1, wherein a positive lens is arranged at a most-image-side position in the third lens group, and
wherein a negative meniscus lens having a concave surface facing the object side is arranged immediately on the object side of the positive lens arranged at the most-image-side position in the third lens group.

3. A small-size wide angle lens, as defined in claim 2, wherein the following formulas (4) and (5) are satisfied:

$$1.75 < Nd3n \quad (4); \text{ and}$$

$$1.8 < Nd3p \quad (5), \text{ where}$$

Nd3n is the refractive index of the negative meniscus lens in the third lens group with respect to d-line, and
Nd3p is the refractive index of the positive lens arranged at the most-image-side position in the third lens group with respect to d-line.

4. A small-size wide angle lens, as defined in claim 1, wherein the second lens group includes a cemented lens composed of a double-concave lens and a double-convex lens, which are cemented together in this order from the object side.

5. A small-size wide angle lens, as defined in claim 4, wherein a positive lens is arranged at a most-image-side position in the third lens group, and
wherein a negative meniscus lens having a concave surface facing the object side is arranged immediately on the object side of the positive lens arranged at the most-image-side position in the third lens group, and
wherein an aspheric lens is arranged between the cemented lens in the second lens group and the negative meniscus lens in the third lens group.

6. A small-size wide angle lens, as defined in claim 4, wherein the following formulas (6) and (7) are satisfied:

$$1.7 > Nd2n \quad (6); \text{ and}$$

$$1.8 < Nd2p \quad (7), \text{ where}$$

Nd2n is the refractive index of the double-concave lens in the second lens group with respect to d-line, and
Nd2p is the refractive index of the double-convex lens in the second lens group with respect to d-line.

7. A small-size wide angle lens, as defined in claim 4, wherein the following formula (8) is satisfied:

$$1.8 < Ndp \quad (8), \text{ where}$$

Ndp is an average value of the refractive index, with respect to d-line, of a positive lens having a highest refractive index with respect to d-line as a positive lens in the first lens group, the refractive index of the double-convex lens in the second lens group with respect to d-line, and the refractive index of a most-image-side positive lens in the third lens group with respect to d-line.

8. A small-size wide angle lens, as defined in claim 1, wherein focus is adjusted from an infinite distance object to a short distance object by moving the first lens group and the second lens group together as one body toward the object side.

9. A small-size wide angle lens, as defined in claim 8, wherein the following formula (9) is satisfied:

$$0.6 < fG12/f < 0.9 \qquad (9),$$

where fG12 is a combined focal length of the first lens group and the second lens group.

10. A small-size wide angle lens, as defined in claim 1, wherein the third lens group substantially consists of two lenses.

11. A small-size wide angle lens, as defined in claim 1, wherein the second lens group substantially consists of a positive meniscus lens, a cemented lens composed of a negative lens and a positive lens, and an aspheric lens, which are arranged in this order from the object side.

12. A small-size wide angle lens, as defined in claim 1, wherein the first lens group substantially consists of a negative meniscus lens having a convex surface facing the object side and a positive lens having a convex surface facing the object side, which are arranged in this order from the object side.

13. A small-size wide angle lens, as defined in claim 12, wherein the negative meniscus lens and the positive lens having the convex surface facing the object side are cemented together.

14. A camera comprising:
a small-size wide angle lens, as defined in claim 1.

* * * * *